(12) United States Patent
Staebler

(10) Patent No.: US 9,088,640 B2
(45) Date of Patent: Jul. 21, 2015

(54) SMART PHONE CRADLE AND CHARGER DEVICE AND METHOD

(75) Inventor: Jeffrey R. Staebler, Livonia, MI (US)

(73) Assignee: PHONITURE, LLC, Southfield, MI (US)

( * ) Notice: Subject to any disclaimer, the term of this patent is extended or adjusted under 35 U.S.C. 154(b) by 196 days.

(21) Appl. No.: 13/553,030

(22) Filed: Jul. 19, 2012

(65) Prior Publication Data

US 2013/0023312 A1   Jan. 24, 2013

Related U.S. Application Data

(60) Provisional application No. 61/509,819, filed on Jul. 20, 2011.

(51) Int. Cl.
*H04M 1/04* (2006.01)
*H02J 7/00* (2006.01)

(52) U.S. Cl.
CPC ............... *H04M 1/04* (2013.01); *H02J 7/0044* (2013.01); *H02J 2007/0062* (2013.01)

(58) Field of Classification Search
CPC .. H04M 1/04; H02J 2007/0062; H02J 7/0044
USPC .......... 455/550.1, 567.1, 569, 572, 573, 574, 455/575.1, 90.1, 90.3, 347, 351; 379/454, 379/455
See application file for complete search history.

(56) References Cited

U.S. PATENT DOCUMENTS

| | | |
|---|---|---|
| D279,052 S | 6/1985 | McDonald |
| D407,230 S | 3/1999 | Lieberman |
| D427,590 S | 7/2000 | Mou |
| D430,154 S | 8/2000 | Mou |
| D446,513 S | 8/2001 | Mou |
| D471,907 S | 3/2003 | Peiker |
| 7,191,924 B2 | 3/2007 | Kilmer |
| D609,461 S | 2/2010 | Boyd |
| 2002/0191782 A1 | 12/2002 | Beger et al. |
| 2005/0135603 A1* | 6/2005 | Stanford ...................... 379/454 |
| 2005/0141699 A1 | 6/2005 | Cheung |
| 2009/0175458 A1 | 7/2009 | Smith |
| 2009/0280871 A1* | 11/2009 | Hofer et al. ................... 455/573 |
| 2009/0292851 A1 | 11/2009 | Mead et al. |
| 2011/0019860 A1 | 1/2011 | Birch et al. |

* cited by examiner

*Primary Examiner* — Thanh Le
(74) *Attorney, Agent, or Firm* — Young Basile Hanlon & MacFarlane P.C.

(57) ABSTRACT

Disclosed is an electronic device cradle for use with smart phones, tablets, MP3 players and other electronic devices. In one example, the cradle is configured to be in the form of common household furniture and includes recesses allowing the phone to be received or docked in an upright position or on the phones side. The cradle may include a charging device allowing several different ways to charge the phone and illumination features to enhance the look and functionality of the cradle.

19 Claims, 17 Drawing Sheets

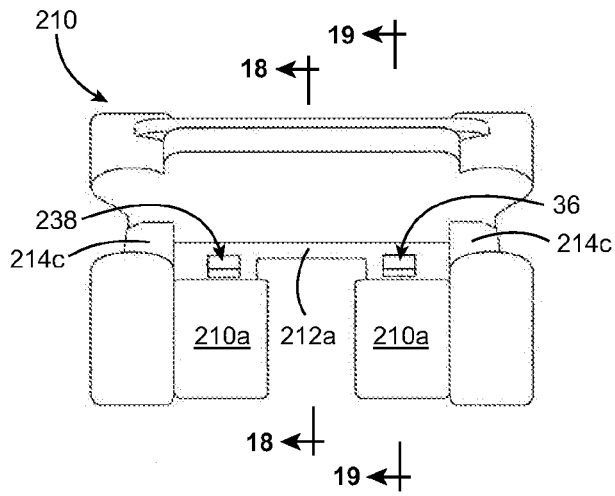
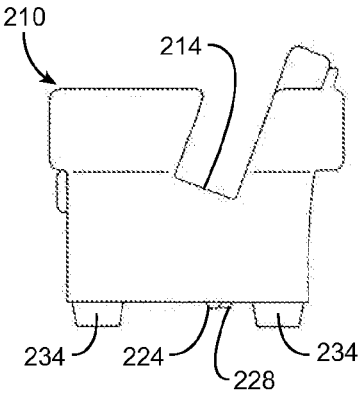
FIG. 14    FIG. 15
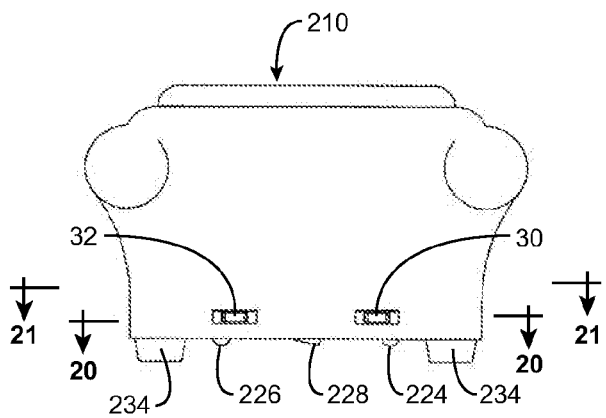
FIG. 16
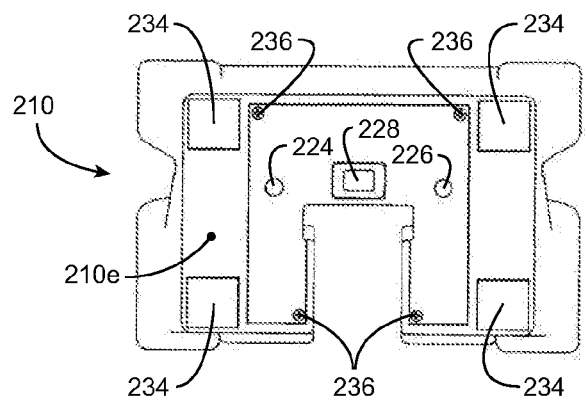
FIG. 17

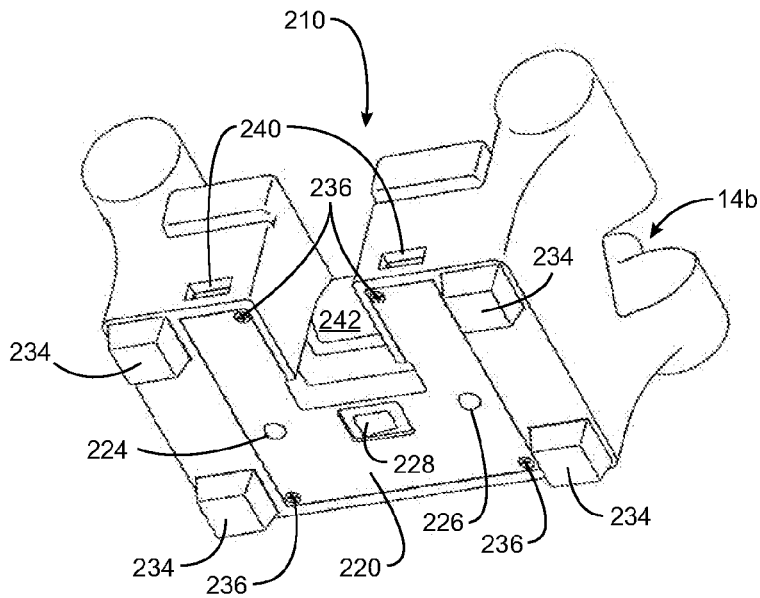
FIG. 22
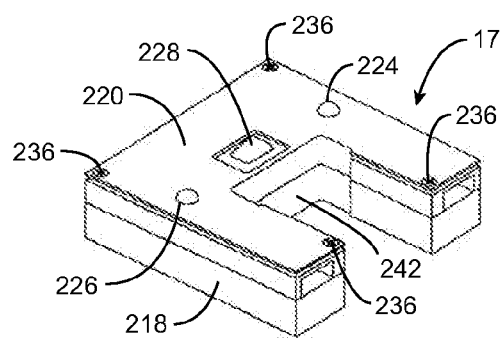
FIG. 23
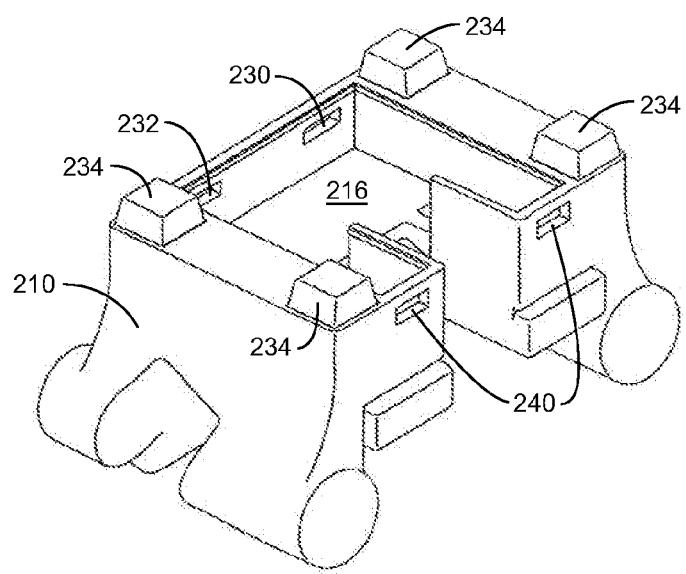

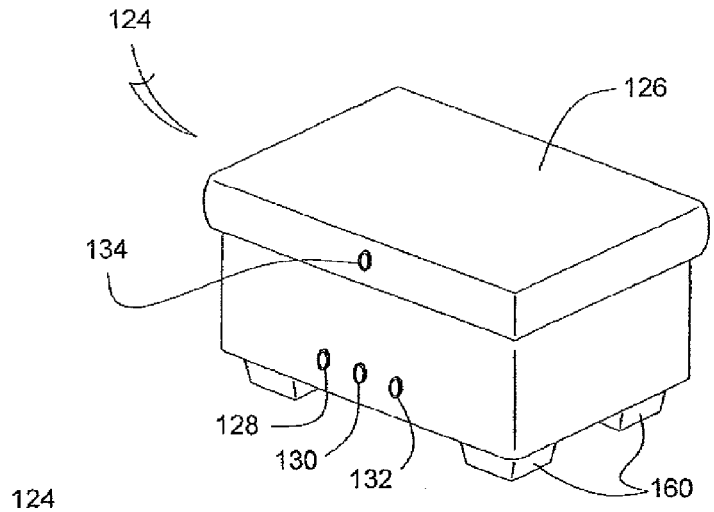
FIG. 31
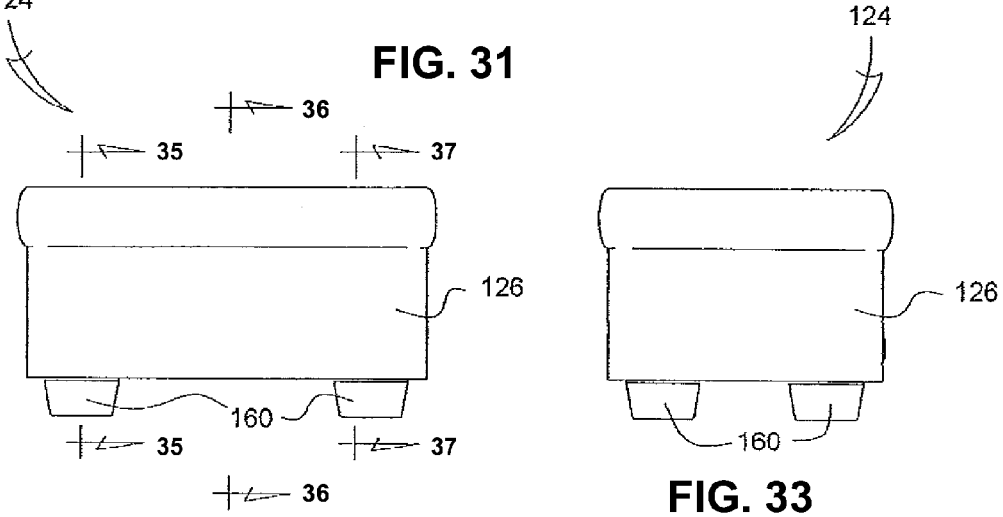
FIG. 32
FIG. 33
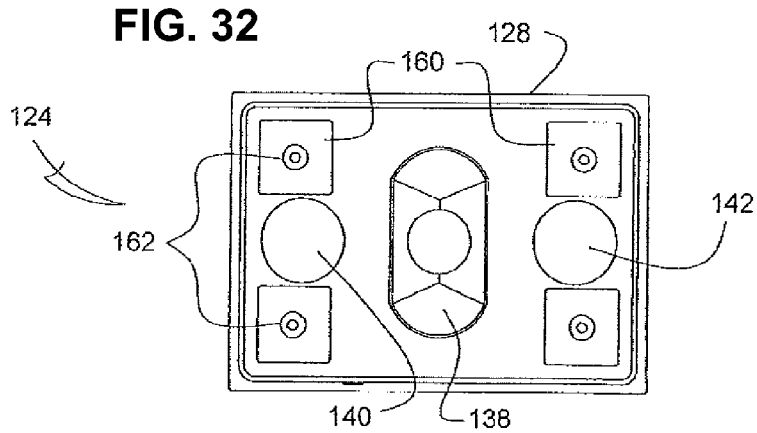
FIG. 34

US 9,088,640 B2

SMART PHONE CRADLE AND CHARGER DEVICE AND METHOD

CROSS-REFERENCE TO RELATED APPLICATIONS

The present application claims priority benefit to U.S. Provisional Patent Application No. 61/509,819 filed Jul. 20, 2011, the entire contents incorporated herein by reference.

FIELD OF THE INVENTION

The present invention is generally in the field of cradles, supports and docking stations for electronic devices, for example smartphones.

SUMMARY OF THE INVENTION

The present invention discloses a cradle or docking station for supporting an electronic device such as, but not limited to, a tablet, an MP3 player or a smart phone. Non-limiting examples of smartphones include Blackberry®, I Phone® or Droid® brand smartphones. In one example, the invention is in the form of common household furniture shapes, for example a sitting chair, and provides for the phone to rest upright on its end or sideways on its side.

In another example, the invention also includes several electronic device battery charging capabilities and methods through use of one or more ports in the cradle body and power cords connectable to the cradle and electronic circuitry built into the cradle.

In other examples, the cradle includes several ways to increase or amplify the audible sounds produced by the electronic device including ports or apertures which channel the sound signals through the bottom of the cradle or through the front of the cradle.

In other examples, the cradle exhibits a weighted, non-slip base for providing upright/angled support of the phone. In another example, the cradle is used with selectively connectible remote speakers which receive digital signals from either the cradle or electronic device for delivery of audio sound from the speakers. In one example, the speakers are also in the shape of household furniture, for example a miniature table/floor lamp and ottoman.

BRIEF DESCRIPTION OF THE DRAWINGS

Reference will now be made to the attached drawings, when read in combination with the following detailed description, wherein like reference numerals refer to like parts throughout the several views, and in which:

FIG. 14 is a top view of the cradle shown in FIG. 18;
FIG. 15 is a right side view of the cradle shown in FIG. 18;
FIG. 16 is a rear view of the cradle shown in FIG. 18;
FIG. 17 is a bottom view of the cradle shown in FIG. 18;
FIG. 22 is a rotated underside perspective of the design in FIG. 12;
FIG. 23 is a partially exploded view of the assembly shown in FIG. 12;
FIG. 31 is a perspective view of an example of an ottoman shaped audio output accessory for use with the phone cradle;
FIG. 32 is a rear view of the ottoman shaped accessory of FIG. 31;
FIG. 33 is a side view of the ottoman shaped accessory of FIG. 31;
FIG. 34 is a bottom view of the ottoman shaped accessory of FIG. 31.

DETAILED DESCRIPTION OF THE PREFERRED EMBODIMENTS

Referring to FIGS. 1-25, several examples of a cradle 1 for use with electronic devices are illustrated. As used herein, "electronic devices" include but are not limited to smartphone cellular phone devices, tablets, and MP3 players. Referring to FIGS. 26-38, examples of remote audio speakers useable with the cradle 1 are illustrated.

In the examples illustrated, cradle 1 is shown in the preferable form and configuration of a comfortable, traditionally-styled arm chair. Although not illustrated, the cradle 1 can take other forms of traditional and contemporary-style chairs, sofas and other furniture. Other forms may include for example outdoor or beach furniture, for example Adirondack-style chairs and other outdoor furniture. Other shapes and configurations known by those skilled in the field may be used.

Figure 2:
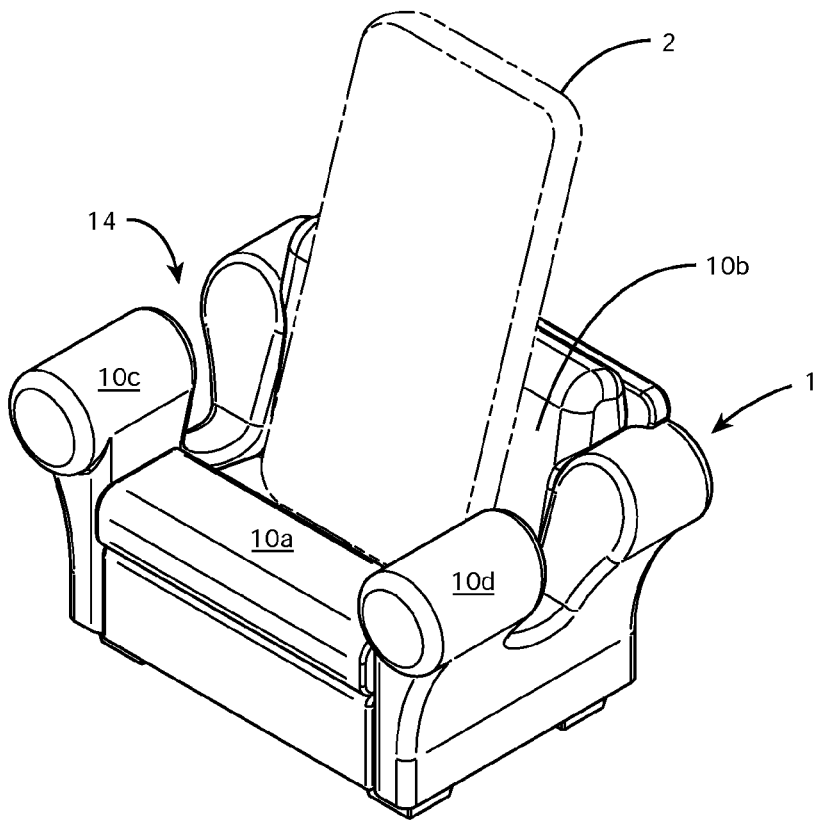
FIG. 2 is a perspective view of the example cradle of FIG. 1 with an example electronic device in the form of a smartphone positioned in an upright orientation.
Figure 3:
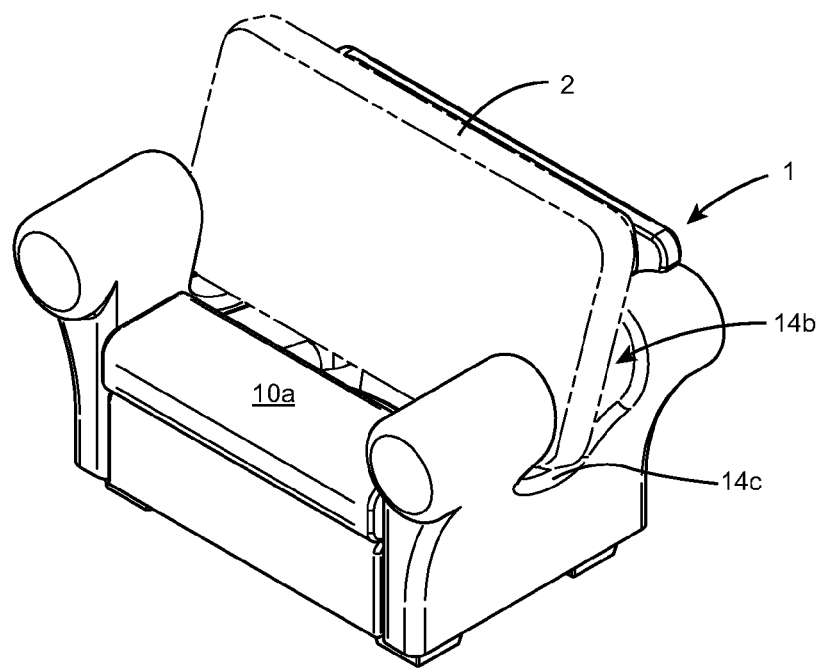
FIG. 3 is an alternate perspective view of the example cradle of FIG. 2 with the smartphone positioned in an rotated or side orientation.
Figure 4:
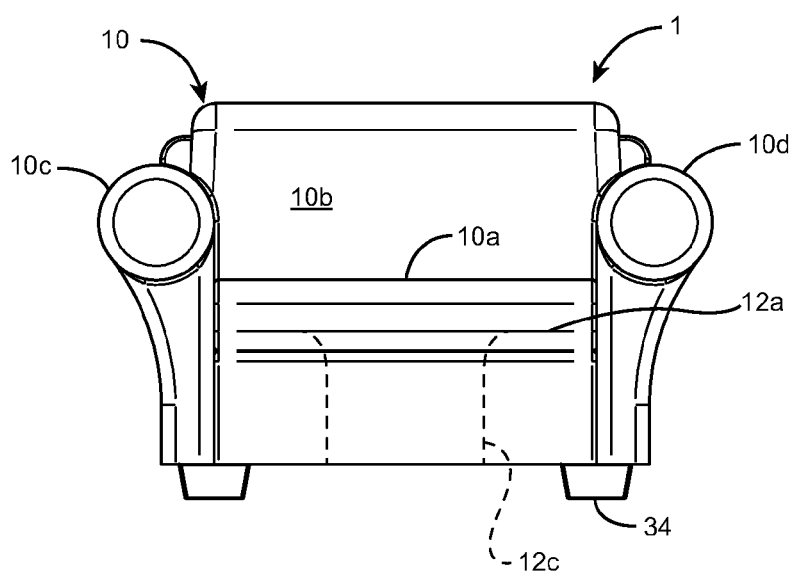
FIG. 4 is a front view of the unit shown in FIG. 1.

As best seen in FIGS. 2 and 3, in a preferred but not exclusive application, the cradle 1 preferably receives, supports and/or "docks" with a smart phone 2 in either an upstanding or sideways position. The smart phone 2 can be, as non-limiting examples, any type of Blackberry®, I Phone® or Droid®; however, other operating systems can also be supported. It is understood that the cradle 1 may also be configured and used with other electronic devices known by including MP3 players, tablet devices, for example the iPad®, gaming devices for example, but not limited to, Nintendo DS® and other audio, video and electronic devices known by those skilled in the art.

Figure 1:
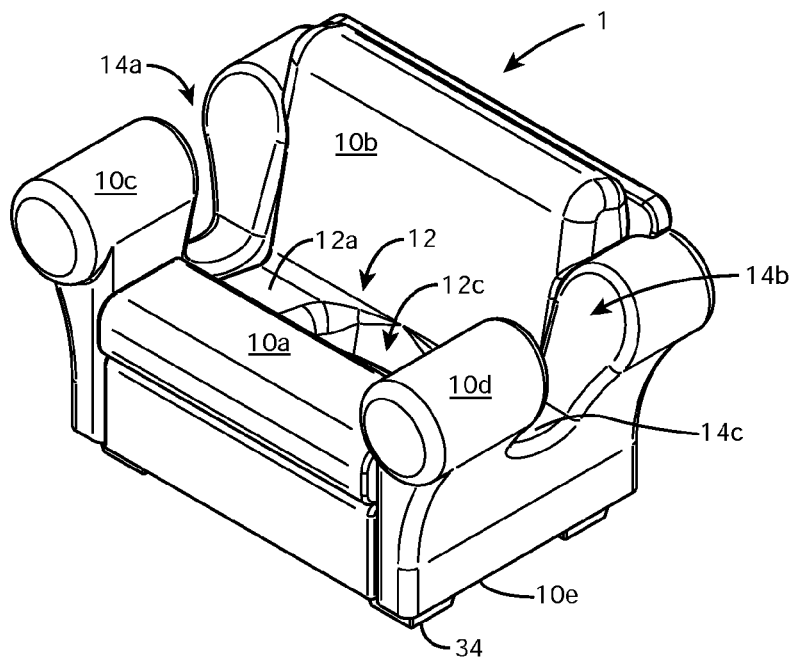
FIG. 1 is a perspective view of one example of the cradle device in the form of a comfort chair.
Figure 5:
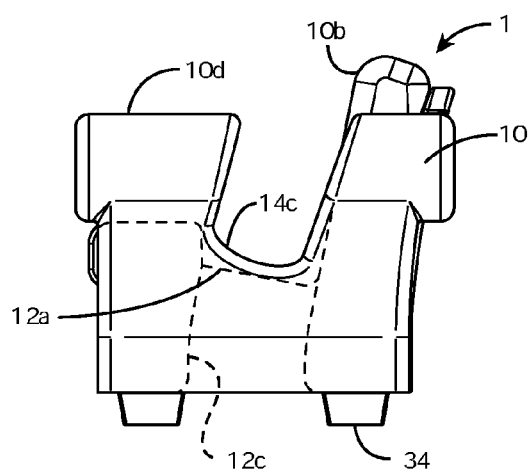
FIG. 5 is a right side view of the unit shown in FIG. 1.
Figure 6:
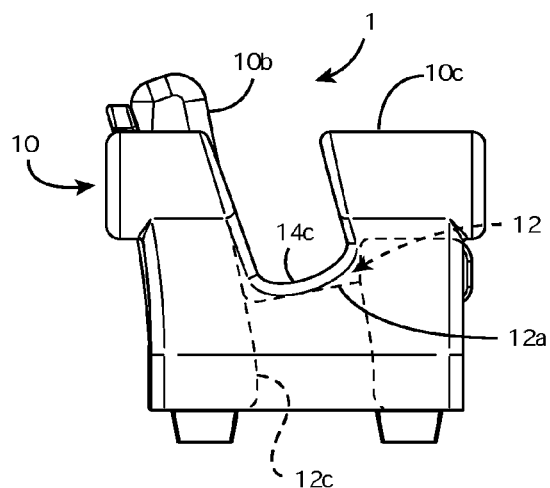
FIG. 6 is a left side view of the unit shown in FIG. 1.
Figure 7:
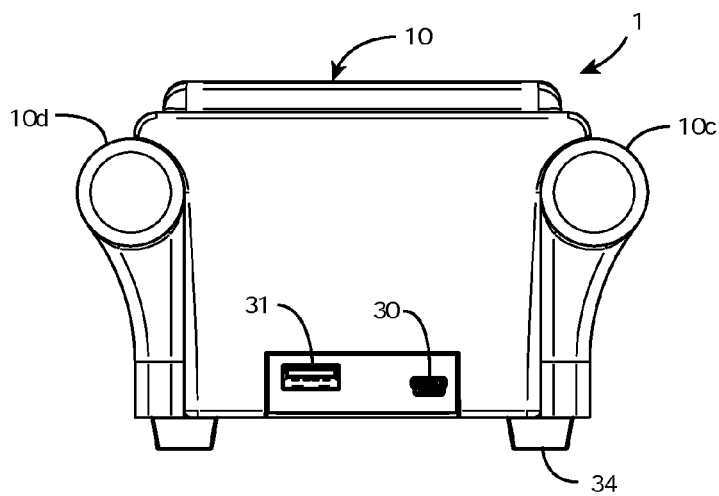
FIG. 7 is a rear view of the unit shown in FIG. 1.
Figure 8:
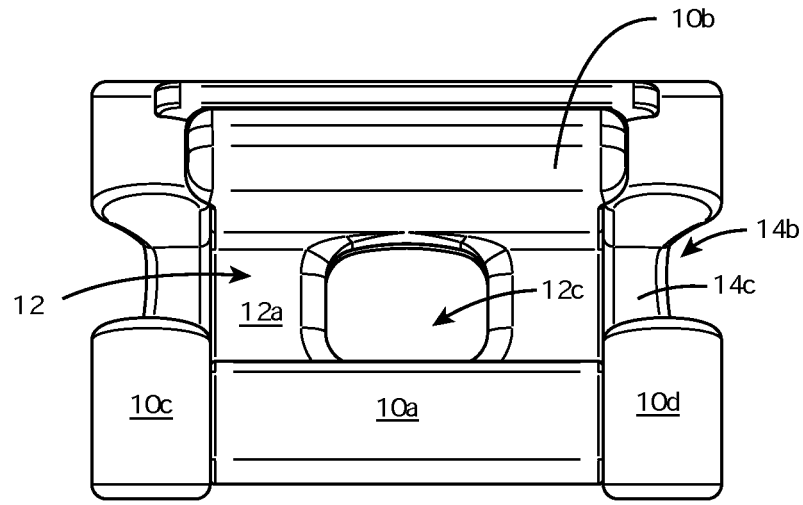
FIG. 8 is a top view of the unit shown in FIG. 1.

As best seen in FIGS. 1-3, the example of cradle 1 includes a traditional arm chair shaped body 10 having a seat portion 10a, a backrest 10b, a first arm 10c, a second arm 10d and a bottom surface 10e. As best seen in FIGS. 1, 5 and 6, in the example, seat 10a is substantially horizontal and backrest 10b is angularly reclined or offset from seat 10a as generally shown. It is understood that seat 10a can take other forms or orientations to suit the particular style chair design used for body 10 or to suit the particular electronic device, or class of electronic devices, to be used with cradle 1.

Figure 11:
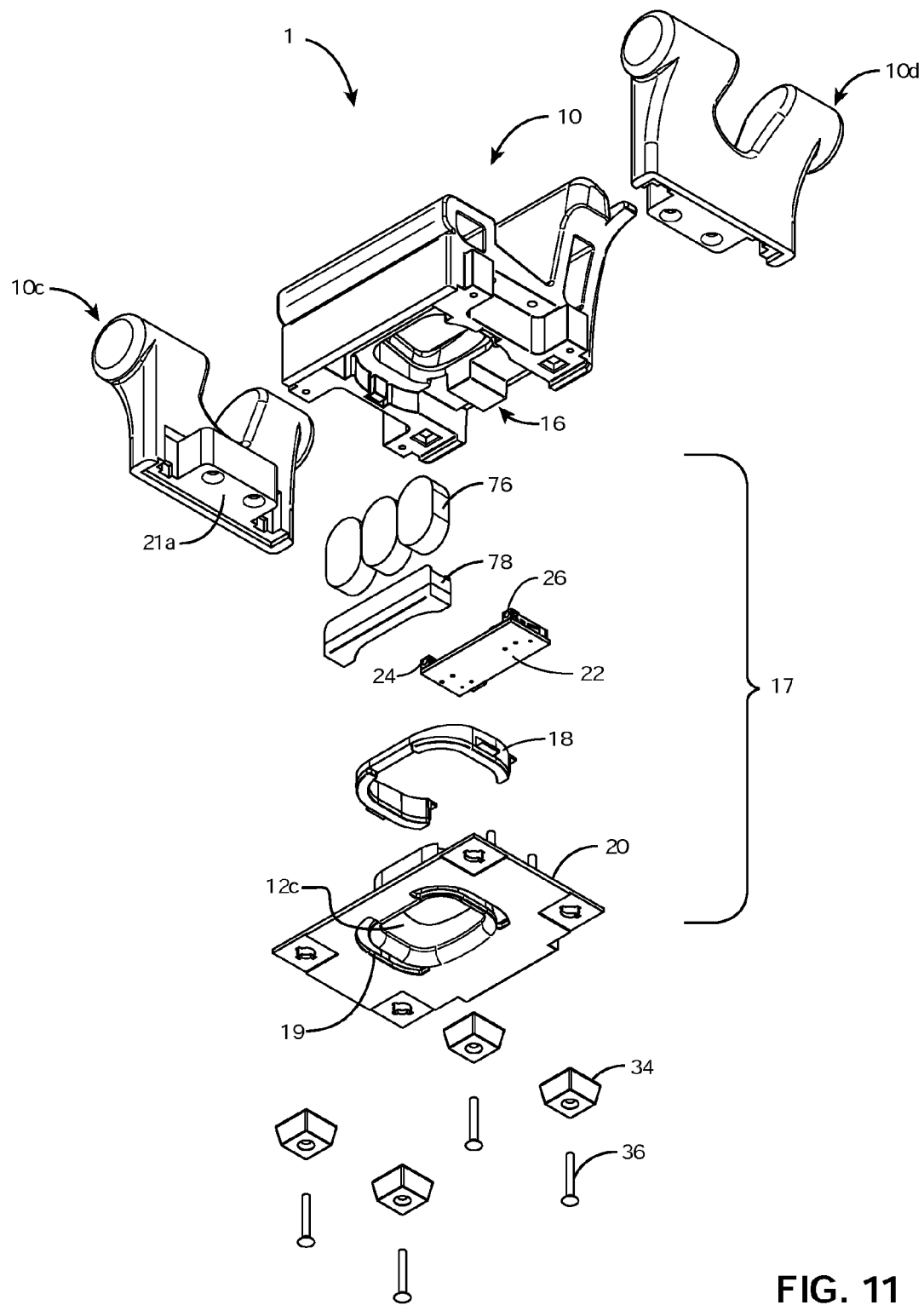
FIG. 11 is an alternate perspective exploded view of the example shown in FIG. 1.

Referring to the example cradle shown in FIGS. 1 and 11, cradle body 10 includes a first or seat recess 12 which extends downward into seat 10a ending in a lower support surface 12a. In the example shown, lower support surface 12a is substantially perpendicular to the backrest 10b. Other angles and configurations of first recess 12 and lower support surface 12a known by those skilled in the art may be used.

In a preferred example shown in FIGS. 1, 5, 6 and 10, body 10, first arm 10c and second arm 10d further include a second or arm recess 14a and third or arm recess 14b respectively. Second 14a and third 14b arm recesses preferably are aligned with first or seat recess 12 and extend downward into the respective arms ending at lower support surface 14c as generally shown. Similar to first recess lower support surface 12a, lower support surfaces 14c are preferably oriented perpendicular to backrest 10b, angularly offset from seat 10a. In the example, arm lower support surfaces 14c are elevated or higher than first recess lower support surface 12a. As shown in FIG. 3, when a phone 2 is positioned and supported in a side orientation on supports 14c, the phone is raised above support surface 12, for example as shown in FIG. 2. Support surfaces 14c can vary in height, configuration and/or location to suit the particular shape and configuration of cradle 1 as known by those skilled in the art. For example, depending on the type of cradle in the form of a certain type of chair or other piece of furniture, the recesses may only include a lower support surface or platform and not have walls in both the front and the back of the recess.

As best seen in FIGS. 2-5, first 12, second 14a and third 14b recesses are preferably sized, shaped and configured to receive a smartphone 2. Other shapes and configurations to receive other electronic devices known by those skilled in the art may be used. A convenient feature of the preferred cradle 1 is through use of the first 12, second 14a and third 14b recesses, phone 2 can easily be engaged in cradle 1 either upright/vertically (FIG. 2) or sideways on its side (FIG. 3) without adapters or auxiliary components common in conventional "universal" type cradles or docking stations.

In the preferred example, illustrated cradle 1 is configured in the form of an arm or sitting chair having cushions and padded arms to simulate traditional home furnishings. Alternate configurations are shown in FIGS. 12-24. The coverings of the cradle would preferably match or simulate those of the particular configured home furniture, for example, leather, microfiber and other textiles known by those skilled in the art. In other forms or configurations (not shown), the chair may not be covered, but may be wooden, for example an Adirondack beach-style chair. It is understood that other cradle configurations in the form of other common furniture styles, indoor, outdoor, traditional or modern, known by those skilled in the art may be used.

Figure 10:
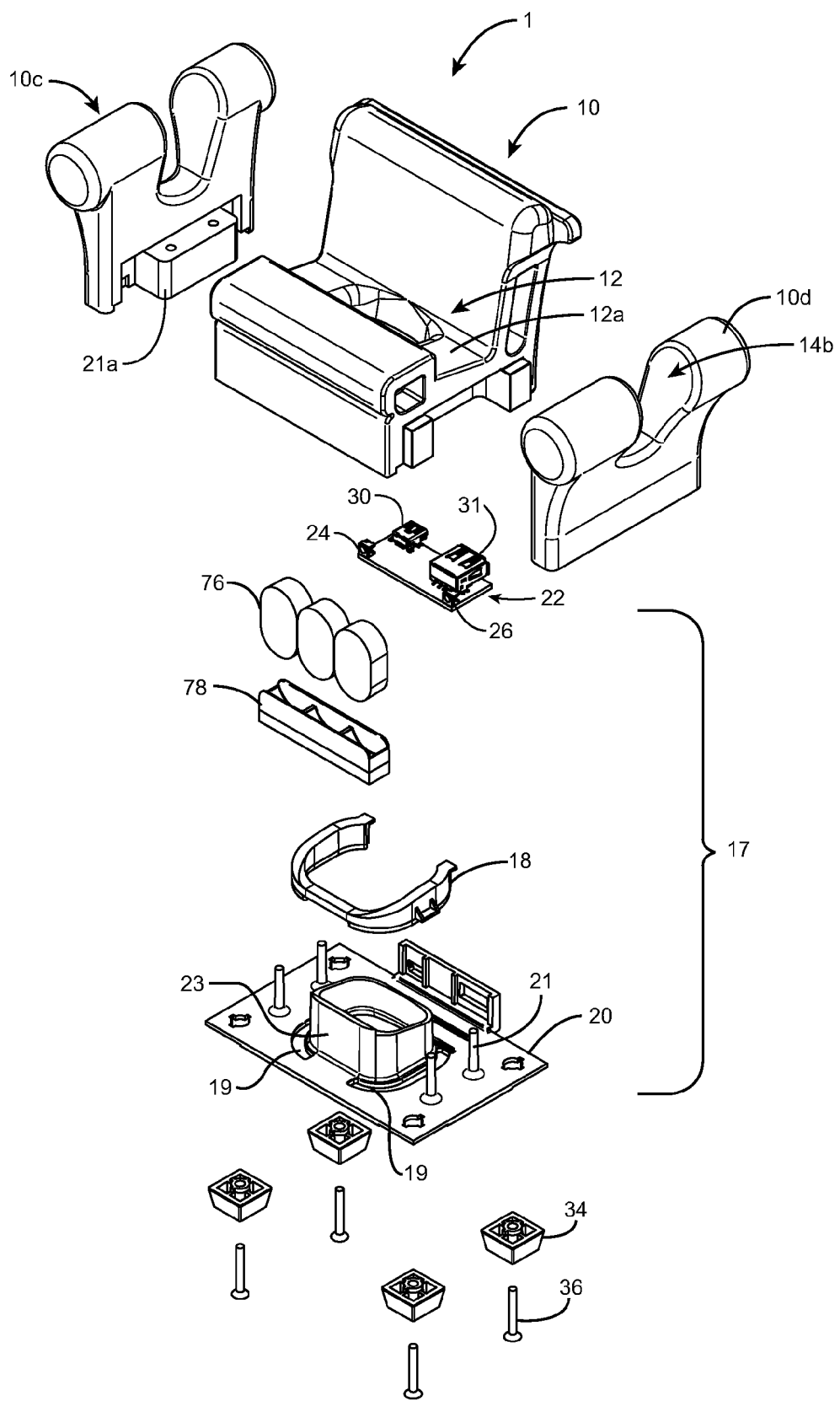
FIG. 10 is a perspective exploded view of the example shown in FIG. 1.

Referring to FIGS. 10 and 11, the preferred cradle in FIG. 1 includes an example of a concave cavity 16 on the underside of body 10 is configured to receive an exemplary combined weighted, charging and illumination unit 17 used to stabilize and provide a source or means to charge the phone 2 or other electronic device when in cradle 1 and also provide some illumination or glow from the underside of the cradle 1.

In the example, charging unit 17 as best seen in the FIGS. 10 and 11 example, the includes a circuit board 22, upon which is supported an illumination device, for example LED elements 24 and 26, an on/off switch 28 (not shown), a dimmer control module (not shown) and USB ports 30 and 32 in electronic communication with the circuit board 22 as known by those skilled in the art. In the example, USB port 30 is a small/mini size USB port and port 32 is a standard-sized USB port. Different connections and ports to suit the particular electronic devices and applications known by those skilled in the art may be used. It is understood that one or more of the identified components may be eliminated depending on the model, features and functions of the particular cradle 1.

Figure 9:
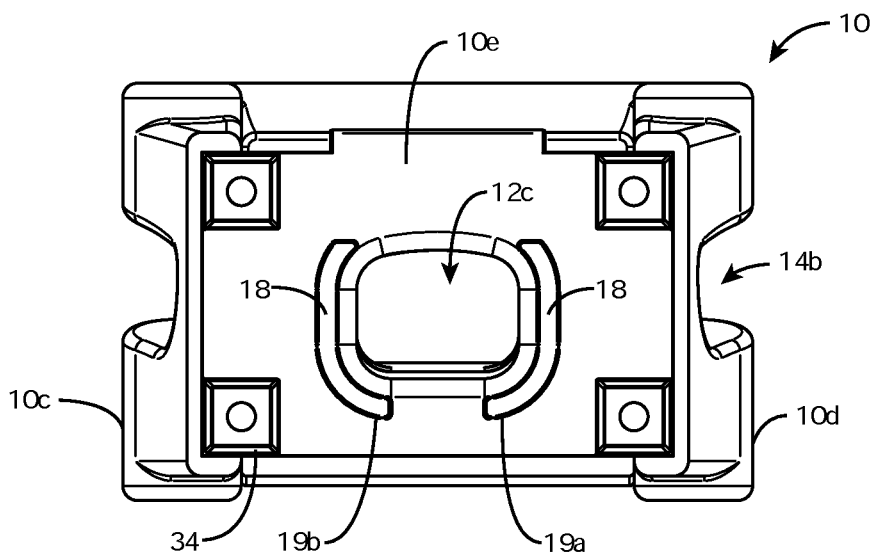
FIG. 9 is a bottom view of the unit shown in FIG. 1.

In the example, unit 17 further includes an illumination device which includes LED lights 24 and 26 electrically connected to circuit board 22 and a light pipe or lens 18 which is configured to fit into and extend through coordinating apertures 19 in the base 20 (see FIG. 9). As best seen in FIG. 9, the light pipe 19 extends downward through the base and provides for a more evenly and widespread illumination source emanating from the bottom of the cradle 1 as opposed to just two LEDs 24 and 26. In the example, a portion of light pipe 19 is placed in close proximity or direct contact with each LED 24 and 26 to direct light from the LEDs into the light pipe to illuminate light pipe 19. Light pipe 19 can be made from acrylic or other clear or translucent materials and optical characteristics as known by those skilled in the art.

The LED elements 24 and 26 and light pipe 18 provide a desirous visual illumination or light effect, such as underneath the cradle 1. In one example, the charging unit 17 and circuit board 22 includes a feature built into the circuit board which detects when there is more of a draw on the power supply to the charger unit, such as which results in a visually indicative dimming of the LED's. Although single LEDs are shown, other forms of illumination devices, for example a light tube or other devices known by those skilled in the art can be packaged and secured similar to the described LEDs.

As best seen in FIGS. 1, 8, 9 and 11, cradle body 10 preferably defines a large central opening 12c to provide a passageway for a power or charging cord to connect to phone 2 while positioned in the cradle 1 in the orientation shown in FIG. 2. The opening 12c further provide a passageway for sound signals generated by the phone 2 and serves as a natural amplification device when cradle 1 is supported in a hard, flat surface. The sound passageway is further assisted by an upstanding flange 23 positioned on the unit 17 base as best seen in FIG. 10.

Referring to FIGS. 9-11, a plurality of pedestal support feet 34 are also secured to underside bottom surface 10e at respective corners of the cradle body through common fasteners 16 or other means, for example adhesive, known by those skilled in the art. In a preferred example, the feet 34 are made from a soft, non-marring polymer or elastomer and may include a cross hatching pattern upon a bottom surface which assists in providing non-slip support. Other materials, configurations and locations known by those skilled in the art may be used. A plurality of fasteners, for example screws (not shown), is also provided for securing the weighted and circuit/power integrated subassembly within the mating recess profile cavity 16 of the body underside. Again, other means for securing the unit 17 to body 10 known by those skilled in the art may be used.

As best seen in FIGS. 10, 16, 20 and 25, the USB portals 30 and 32 further allow for use of a power supply cord or cable 8 and plug 44 which can be separately provided or dedicated to the cradle 1 for powering the phone 2 and/or the underside LED elements as described below and illustrated. A separate and dedicated alternating current (AC) adapter (not shown) and cord may also be included as well as other cords and cables known by those skilled in the art. The power supply cord or cable 8 can also be integrated into the cradle 1 itself.

Figure 20:
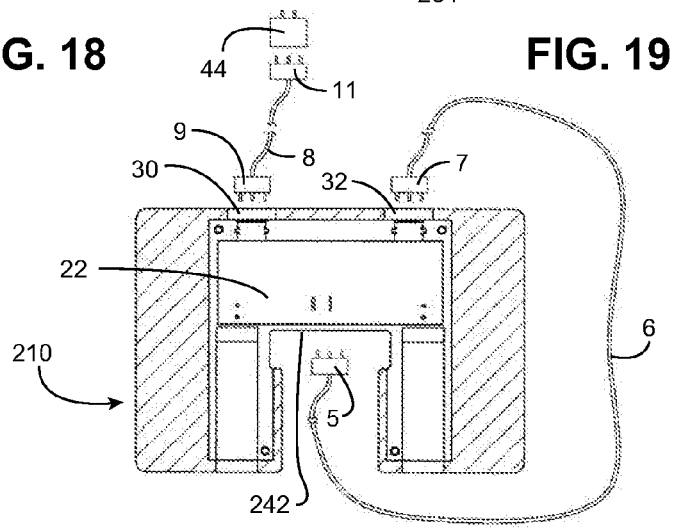
FIG. 20 is sectional view taken along line 20-20 of FIG. 16 showing the circuit board arrangement incorporated into the base of the unit and depicting both a dedicated power cord associated with the unit with a first attachable USB plug end combined with a separate cord exhibiting first and second plug ends for extending from a secondary power source location of the unit to the phone.
Figure 21:
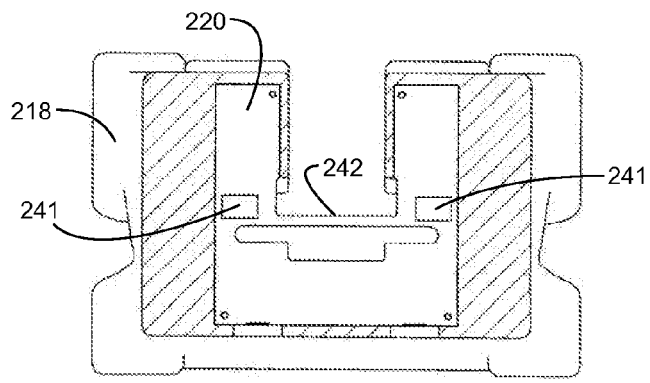
FIG. 21 is a sectional view taken along line 21-21 of FIG. 16 and depicting the weighted base associated with the charger unit.

As best seen in FIG. 20, the cable 8 can be provided as a shorter length cable which is typically provided with the phone, but can also contemplate a longer length (e.g. 6 feet or more) which may, without limitation, be provided as an accessory along with the cradle 1 and utilized as a first cable 8 connecting the cradle 1 to a wall power outlet (such as in use with the USB to 110V converter taken from the phone accessories). The secondary (e.g. typically shorter) cable 6 provided with the phone and outlet converter is then separately connected to another port of the cradle, for example 32, which is in electrical communication with the first port 30, for example through the circuit board 22, to which is electrically connected to the input end 9 of the first cable 8, and at a second end 5 to the phone 2. It is understood that cradle 1 and charging unit 17 may include other means and configurations to power and/or charge phone 2 and power the illumination devices, for example having a rechargeable battery, AC adapter or other electronics to provide a source of power to cradle 1 and or the phone 2 in coordination with cradle 1 as known by those skilled in the art.

Figure 26:
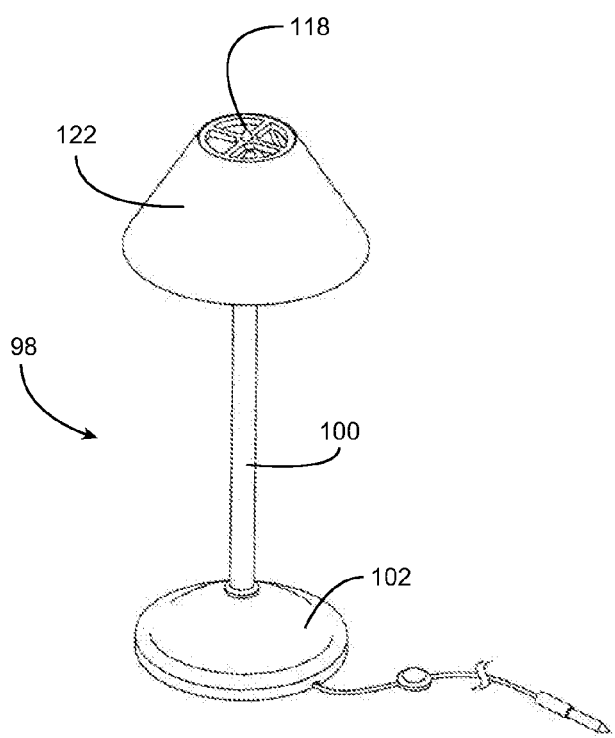
FIG. 26 is a perspective view of an example of a lamp shaped audio output accessory for use with the cradle.

As described central opening 12c provides access for a plug in connector 5 associated with a conventional cord 6 (FIG. 26, but with cord 6 and plug 5 passing through central opening 12c in the preferred example). As further shown in FIG. 26, the connector end 5 of the cord 6 engages an access port associated with the phone 2 (an opposite end of which may include a further USB connector 7 as shown in FIG. 26 and which engages selected first USB port 32 which is again exposed to a rear surface of the charger unit 17 circuit board 22, see FIG. 7). FIG. 26 also depicts a partial length of a further (secondary) cord 8, a first end 9 engaging a second of the USB ports 30, with an opposite end 11 including such as a typical AC outlet plug 44 for providing a power source to the unit 10.

In one example, the charger unit 17 can operate with a separate plug in cord 8 for providing power to the unit, with the pre-existing smart phone cord 6 being supplied to engage the phone 2 at a first end and a communicating power supplied port of the charger unit at a second end. As previously stated, the charger unit 17 can be further modified in other ways to provide for support and charging of the smart phone. Other ways and configurations known by those skilled in the art may be used.

Referring to FIGS. 12-24, an alternate example of the cradle 1 shown in FIGS. 1-11 is illustrated in the form of a differently configured comfort chair 200. In the example, the several of the features of the other exemplary cradles are similar and only summary discussions will be included.

Figure 12:
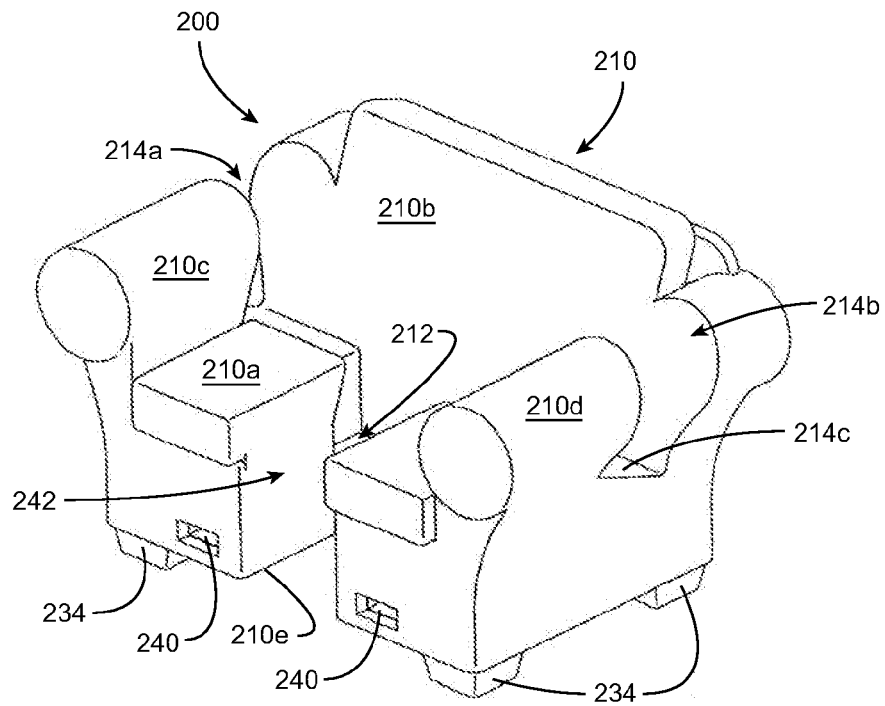
FIG. 12 is a perspective view of an alternate cradle from that shown in FIG. 1.
Figure 24:
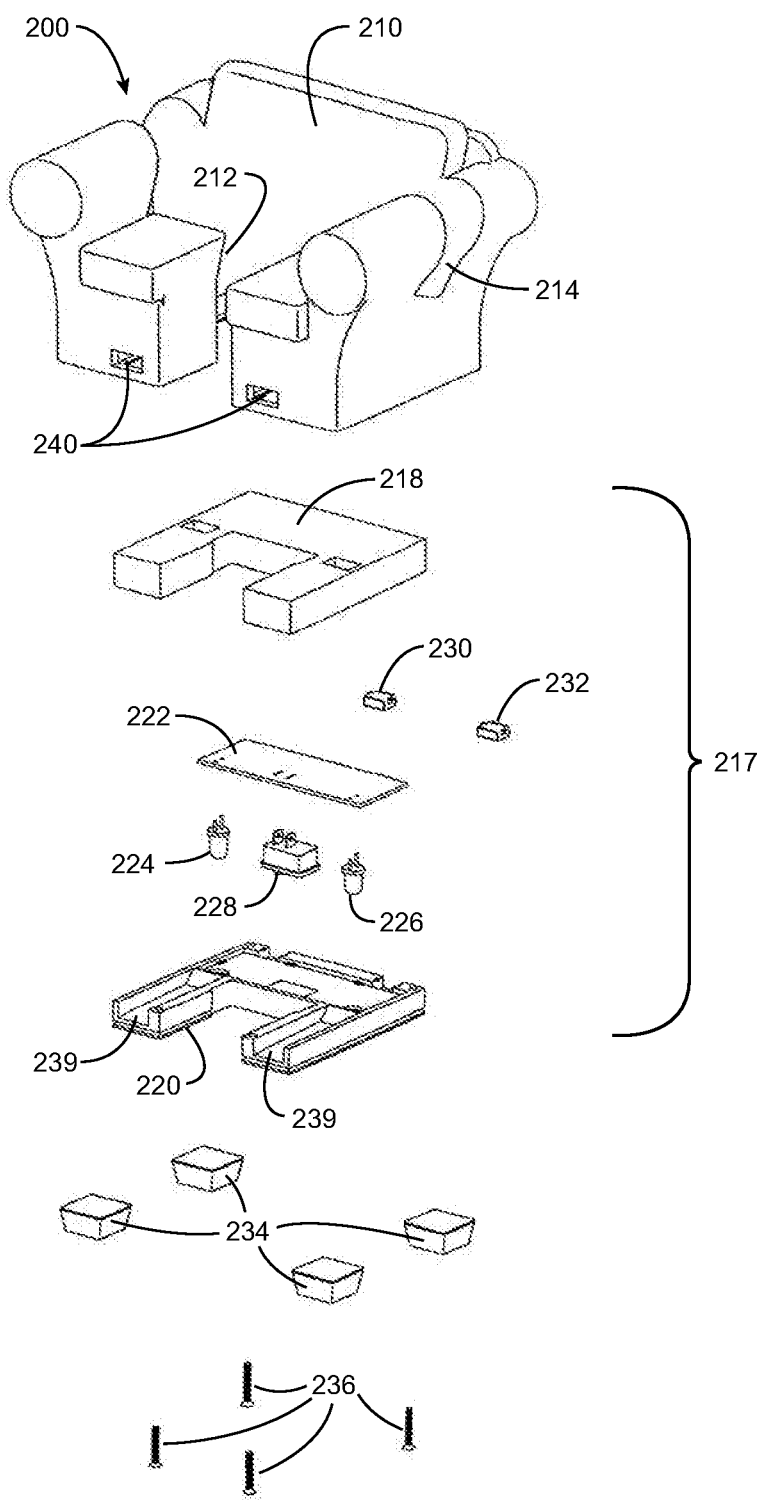
FIG. 24 is an exploded view of the assembly shown in FIG. 12.
Figure 25:
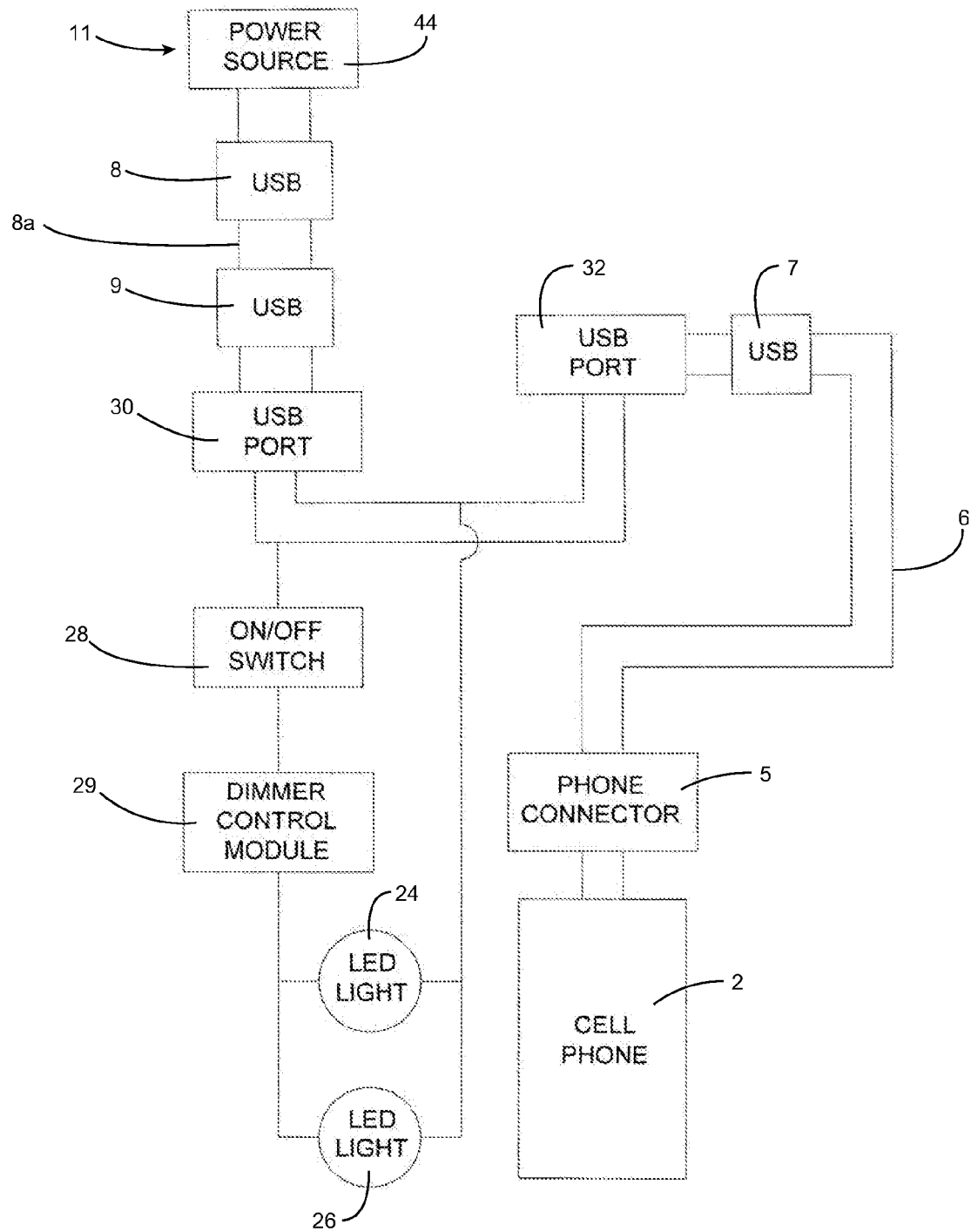
FIG. 25 is a schematic illustration of an example of the power circuitry incorporated into the charger components of the cradle.

As best seen in FIGS. 12, 22 and 24, cradle 200 includes a body 210 having a seat portion 210a, a backrest 210b, a first arm 210c and a second arm 210d as generally illustrated and previously described for the alternate designs. A first recess 212, a first support surface 212a second recess 214a and third recess 214b are also similar in construction and orientation as the prior designs.

Figures 18, 19:
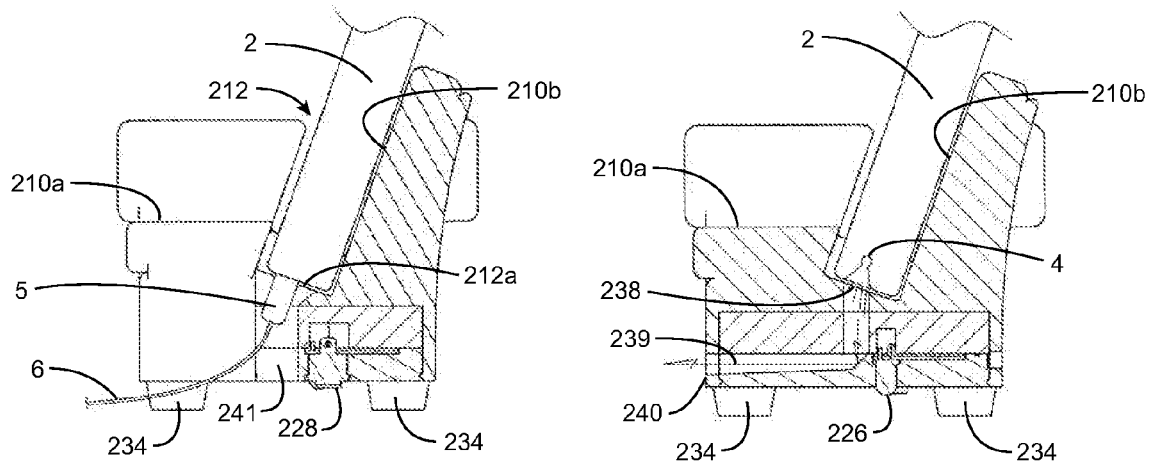
FIG. 18 is sectional view taken along line 18-18 of FIG. 14 and further showing a conventional smart phone supported on the unit with charging cord attached.
FIG. 19 is a sectional view taken along line 19-19 of FIG. 14 and exhibiting a communicating passageway from the phone speaker to a surface location of the charger for enabling use of the phone when supporting upon the unit and for also providing natural sound amplification.

In an alternate and exemplary configuration, body 210 includes a large central opening 42 which opens through the front part of the cradle as best seen in FIGS. 18 and 19 and described further below.

Figure 13:
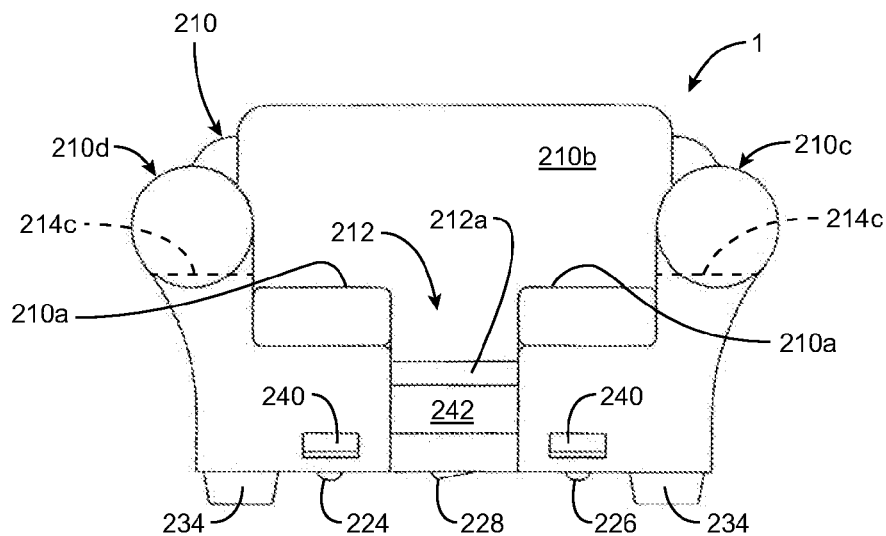
FIG. 13 is a front view of the cradle shown in FIG. 18.

In a one example of the alternate cradle as best seen in FIGS. 12, 19 and 24, cradle 200 includes a first 236 and second 238 sound emitting passageway within the cradle 200 phone cradle body 210 and which permit an audio speaker output associated with the phone 2 (such as depicted at 4 in FIG. 19) to be communicated down through the lower support surface 212a and through the apertures 241 in the bottom surface of cavity 216. Passageways 236 and 238 then communicate the output sound signals angularly/forwardly through respective passageways 239 defined by the base second or lower housing 220 (see exploded view of FIG. 24). The passageways 239 end with forward apertures 240 defined in the front of the cradle body 10 as best seen in FIGS. 12, 13 and 24.

In an alternate example from exemplary cradle 1, in the example shown, charging unit base 217 includes numerous components with the above described features while allowing flush or recess mounting in cavity 216 as generally shown. It is understood that variations and constructions of the sound passageways 236 and 238 known by those skilled in art may be used. For example, a single or multiple passageways may be used depending on the device to be used with cradle 200 as well as the sophistication or model of the cradle 200.

As best seen in FIG. 24, alternate cradle 200 includes a charging and illumination unit 217 having a base including a first or upper housing 218 and a second or lower housing 220. In the example, the charging unit base is in a "U" shaped configuration although other configurations known by those skilled in the art may be used.

The cradle 200 charging unit 217 preferably includes a circuit board 222, upon which is supported an illumination device, for example LED elements 224 and 226, on/off switch 228. The unit 217 may further include dimmer control module (not shown). Unit 217 further includes USB ports 230 and 232 in electronic communication with the circuit board 222 as known by those skilled in the art. It is understood that one or more of the identified components may be eliminated depending on the model, features and functions of the particular cradle 200.

Figure 27:
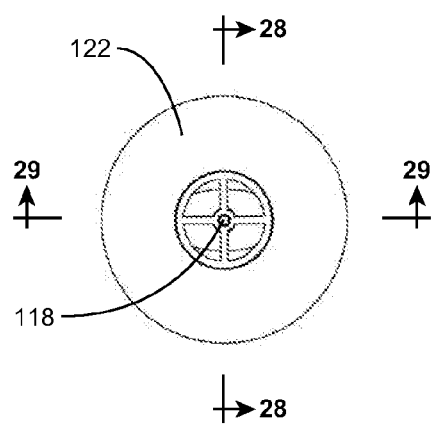
FIG. 27 is a top view of the lamp shaped accessory depicted in FIG. 26.
Figure 28:
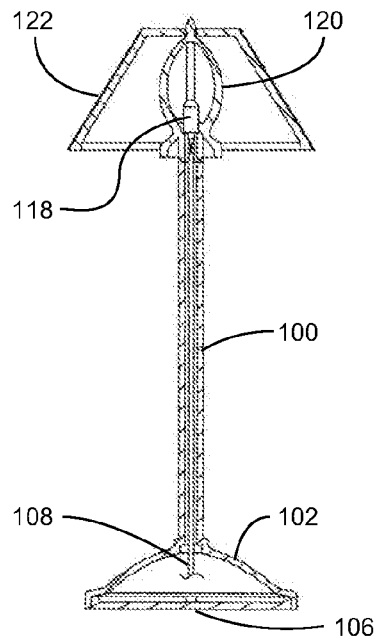
FIG. 28 is a sectional view taken along line 28-28 of FIG. 27.
Figure 29:
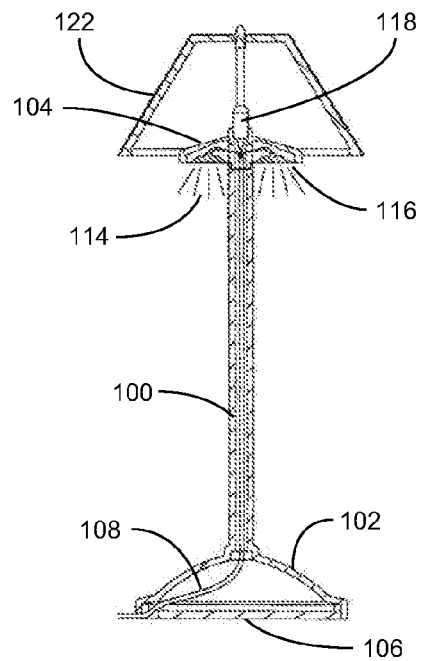
FIG. 29 is a ninety degree rotated sectional view taken along line 29-29 of FIG. 27.
Figure 30:
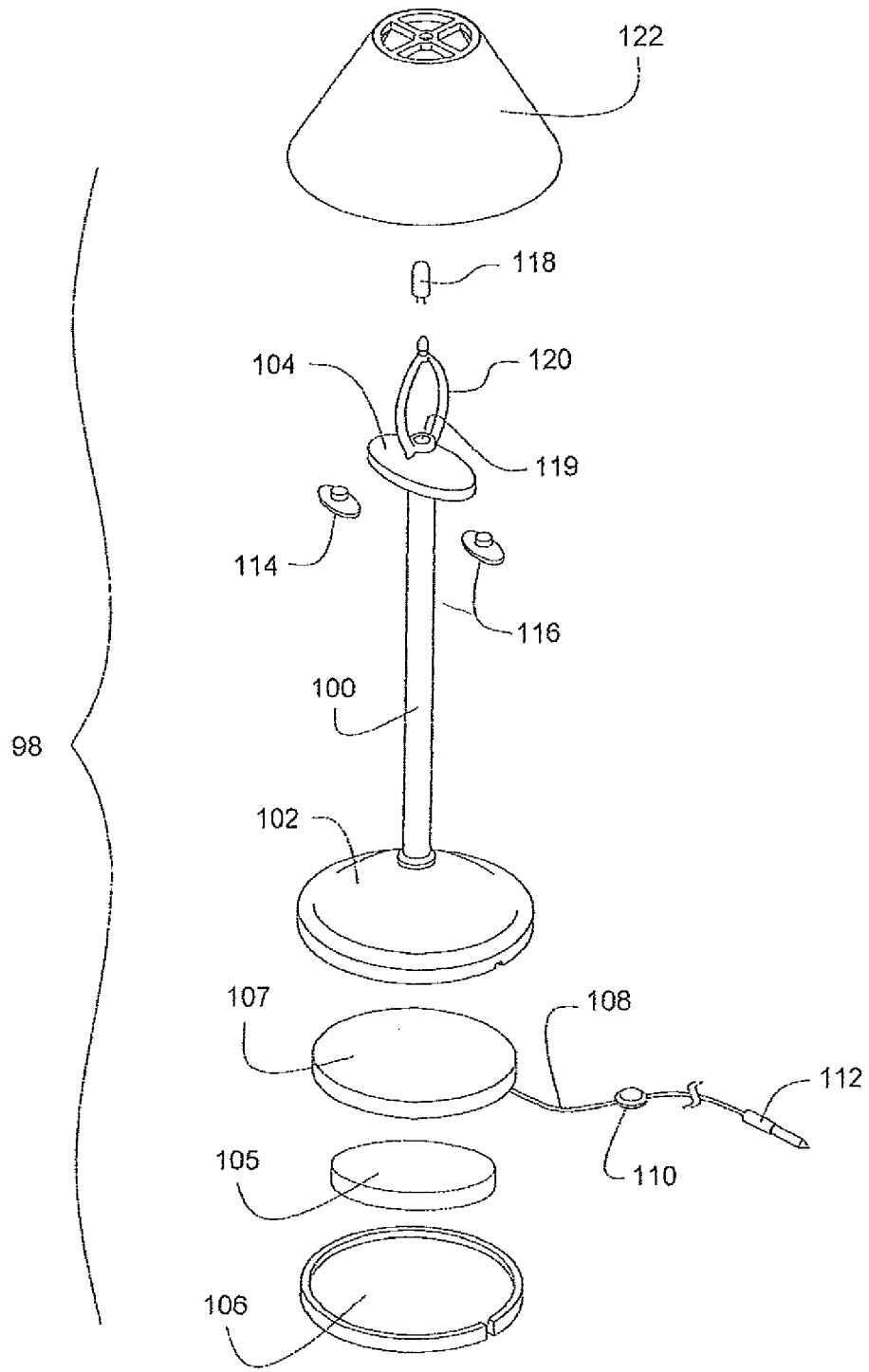
FIG. 30 is an exploded view of the lamp shaped accessory of FIG. 26.
Figure 35:
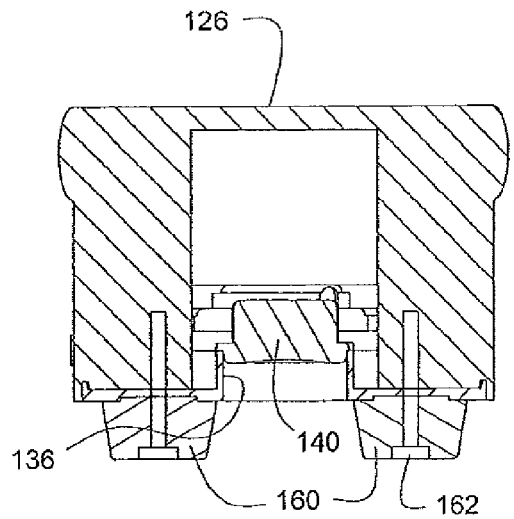
FIG. 35 is a sectional view taken along line 35-35 of FIG. 32.
Figure 36:
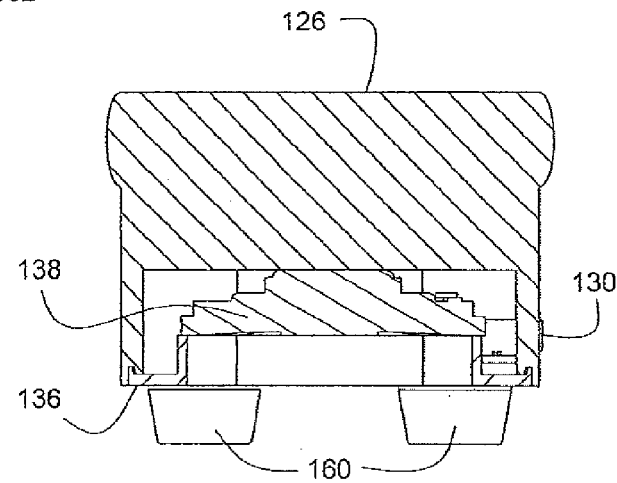
FIG. 36 is a sectional view taken along line 36-36 of FIG. 32.
Figure 37:
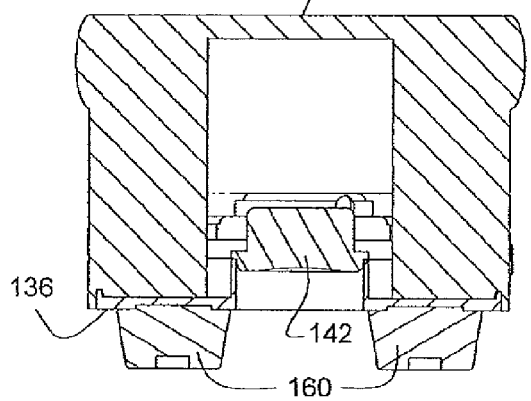
FIG. 37 is a sectional view taken along line 37-37 of FIG. 32.
Figure 38:
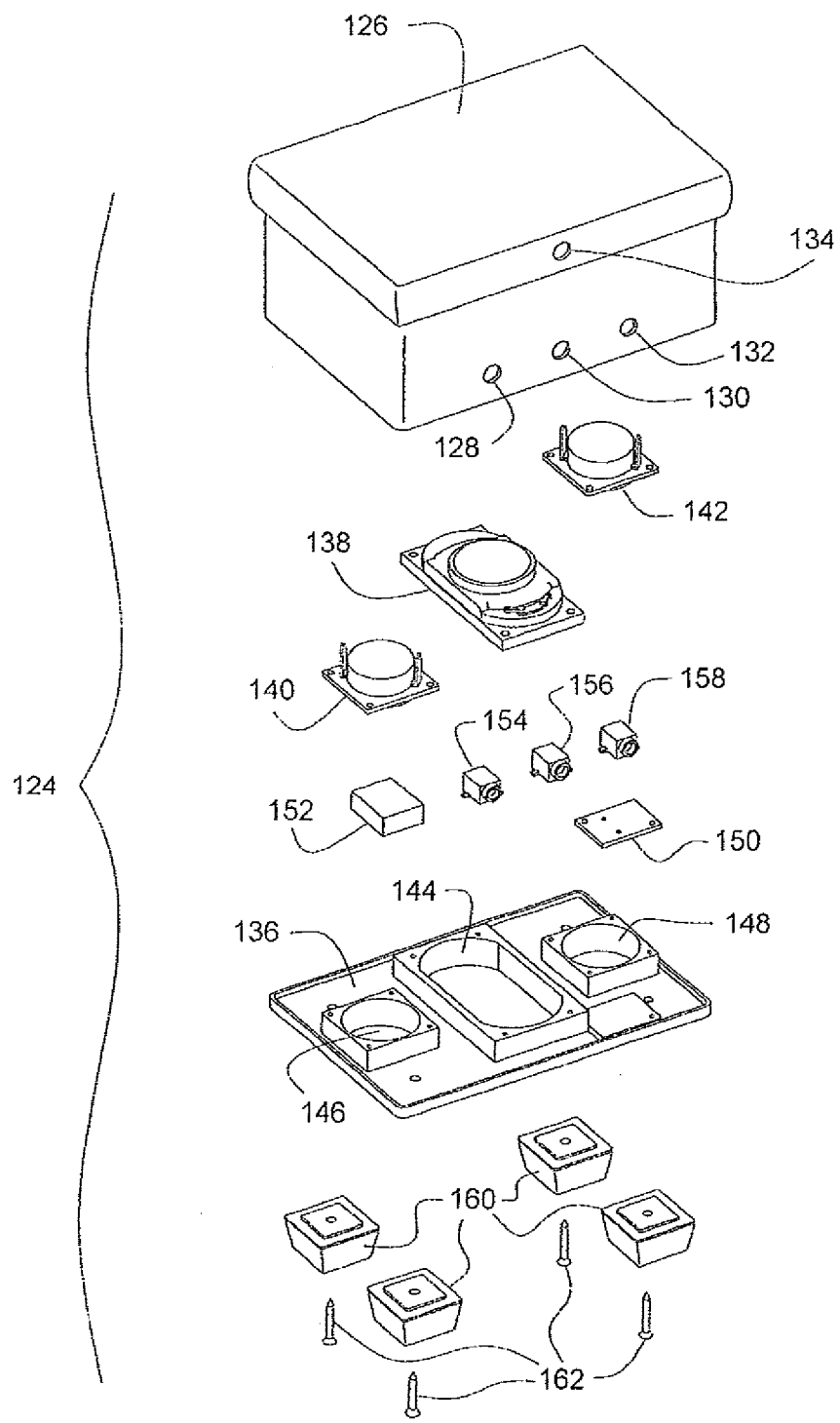
FIG. 38 is an exploded view of the ottoman shaped accessory of FIG. 31.

As best seen in FIGS. 26 and 27, cradle body 210 may define a large central opening 242 for providing access for a plug in connector 5 associated with a conventional cord 6 (FIG. 26). As further shown in FIGS. 18-20, the connector end 5 of the cord 6 engages an access port associated with the phone 2 (an opposite end of which may include a further USB connector 7 as shown in FIG. 20 and which engages selected first USB ports 232 which is again exposed to a rear surface of the charger unit 217). FIG. 20 also depicts a partial length of a further (secondary) cord 8, a first end 9 engaging a second of the USB ports 230, with an opposite end 11 including such as a typical AC outlet plug 44 for providing a power source to the unit 10.

In one example, the charger unit 217 can operate with a separate plug in cord 8 for providing power to the unit, with the pre-existing smart phone cord 6 being supplied to engage the phone 2 at a first end and a communicating power supplied port of the charger unit at a second end. As previously stated, the charger unit can be further modified in other ways to provide for support and charging of the smart phone. Other ways and configurations known by those skilled in the art may be used.

The schematic view of FIG. 25 again includes the various exemplary components including the on/off switch 28, LED lights 24 and 26, and USB input ports 30 and 32 which are built into the circuit board (again at 22 in FIGS. 10 and 222 in FIG. 24) and are applicable to the exemplary cradles 1 and 200 described above. Power source 44 (also reflected by plug attachment 44 in FIG. 20) is also provided (such as an external AC plug but which is also contemplated to include a portable battery power supply). An additional USB port (not shown but understood to form a part of the phone 2) in combination with port 32/232, can correspond to the plug in locations referenced by cord 6 and connector ends 5 and 7 in FIG. 20, with cord 8 (again typically a separate elongated cord provided with the cradle 1) further depicting the connections established between power source 44 and USB port 30/230.

In addition for use with any table top surface, the cradle 1 and charger unit 17/217 design can also be configured or modified for application to such other environments or surfaces such as a vehicle dashboard, nightstand desk, or other surface as known by those skilled in the art. The configuration of the charger unit 17/217 is further such that it is capable of supporting any range of smart phone designs or other electronic devices in either of sideways or upstanding fashion, with the weighted base providing the requisite degree of stable, non-slip support. It is understood that less expensive cradles 1 may not include one or all of the electronic features in charging unit 17/217 as described and illustrated.

Referring now to FIGS. 26-38, examples of remote audio speakers useable with the cradle examples is illustrated. Referring to FIGS. 26-30 a remote speaker 98 configured in the form of a miniature table or floor lamp is shown. As best shown in the corresponding exploded view of FIG. 30, a main body of the lamp includes an upwardly extending stem 100 supported at a lower end by a rounded pedestal 102 and an upper end by an elevated superstructure 104.

A weighted base 106 snap fits with the rounded pedestal 102 and from which extends a cord 108 including a midpoint located on/off push button 110 and an end-most located plug in phone jack 112 (such as for engaging an audio headphone port associated with the phone 2 or other electronic device). A pair of mini output speakers 114 and 116 are engaged to underside locations of the elevated superstructure (see FIG. 29 section) and are electrically communicated with an extending inner end of the cord 108 as shown.

An LED element 118 engages an inner and upper side location 119 of a lampshade support 120 extending upwardly from the superstructure 104, the support 120 engaging also an interchangeable/replaceable lamp shade 122 (such as which can exhibit different designs configurations or colors). In one example, differently colored LED elements can also be interchangeably engaged and it is further understood that the LED elements, according to any embodiment, can also exhibit either or both of a steady or pulsed illuminating pattern. The LEDs are to be powered by a battery 105 and securely retained in place by a circuit board 107, which is securely attached to the stand base 102. The base plate 106 is to be removable to replace the battery (see FIG. 30). It is understood that other sources of power other than battery, for example an electrical cord connectable to a standard wall outlet, known by those skilled in the art may be used.

Referring finally to FIGS. 31-38 collectively, an alternately configured audio output accessory is depicted in the form of an ottoman-styled furniture article 124. As best shown in the exploded view of FIG. 38, the ottoman article 124 includes a one piece generally three dimensional rectangular body 126 exhibiting an underside accessible and recessed interior. In the example, a series of three input ports or apertures, see at 128, 130 and 132 are defined along a lower side and a further microphone aperture 134 can also be located at a further elevated location.

An installable base 136 supports, among other items, a subwoofer 138 and pair of tweeters 140 and 142 at designated locations 144, 146 and 148 respectively. The underside installable base 136 is further configured to support a circuit board 150, microprocessor 152 and mini-input ports 154, 156 and 158, the latter corresponding to the apertures 128, 130 and 132 formed in the ottoman 126. As described above, shown are exemplary feet or pedestal supports 160, these being mounted to corner locations of the base 136 via engagement screws 162 or other attachments as known by those skilled in the art.

Beyond the descriptions provided herein, it is understood that either the lamp 98 or ottoman 124 style audio accessory output components can also incorporate alternative forms both in style and configuration, for example to coordinate with the particular style and configuration of the phone cradle 1/200. Equally, the lamp 98 and ottoman 124 can be powered and electrically and digitally communicate with the other components directly and wirelessly through Bluetooth technology and other known forms of communication. It is also understood that the additional audio output components can be provided either separately or on kit form along with either of the underlying cradle designed furniture articles 1/200 as known by those skilled in the art.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A furniture-shaped electronic device cradle for use in supporting an electronic device, the cradle comprising:
   a cradle body having a width;
   a bottom surface;
   a seat elevated above the bottom surface;
   a backrest angularly oriented from the seat; and
   a first arm and a second arm, each of the first and the second arm respectively extending upward above the seat and laterally outward beyond the backrest, the first and the second arms each define an arm recess respectively extending downward through the respective arm toward the body bottom surface for selective receipt of a portion of the electronic device.

2. The cradle of claim 1 wherein the seat further defines a seat recess extending downward toward the bottom surface, the seat recess includes a lower support surface, the lower support surface is positioned below the seat and adjacent the backrest.

3. The cradle of claim 2 wherein the arm recesses each include a lower support surface elevated above the cradle body seat recess lower support surface for receipt of the electronic device in the cradle.

4. The cradle of claim 3 wherein the arm recesses are aligned with the seat recess along the width of the body.

5. The cradle of claim 1 wherein the arm recesses extend downward through the respective arms at an angle offset from the vertical and angularly oriented toward the backrest to support.

6. The cradle of claim 1 wherein the body further defines a first through passage extending from the seat through the body bottom surface, the first through passage adapted to provide an audio sound path for the electronic device.

7. The cradle of claim 6 wherein a base connected to the body comprises an illumination device in electronic communication with a power source, the illumination device includes an arcuate lens extending around a portion of the through passage.

8. The cradle of claim 7 wherein the at least one illumination device is a light emitting diode (LED) adapted for selective illumination.

9. The cradle of claim 7 wherein the arcuate illumination lens is positioned on the bottom surface and comprises two lenses diametrically opposed across the through passage for substantially even lighting of the cradle.

10. The cradle of claim 7 further comprising an illumination regulator device and a charger connected to the circuit board, the regulator adapted to adjust the level of illumination output from the illumination device based on a level of electrical draw of the charger when charging the electronic device.

11. The cradle of claim 1 further comprising:
a base connected to the cradle body, the base having a housing defining at least one second through passage in communication with a cradle body first passage adapted to provide an audio sound path for the electronic device through to a front of the cradle.

12. The cradle of claim 1 wherein the body further comprises a circuit board connected to a base housing, the circuit board electronically connected to at least a first port adapted for receipt of power from a power source and a second port adapted for receipt and selective transfer of power from the circuit board.

13. The cradle of claim 12 wherein cradle body defines a concave cavity for engaging receipt of the base to substantially conceal the base in the cradle body bottom surface.

14. A furniture-shaped electronic device cradle for use in supporting the electronic device, the cradle comprising:
a cradle body comprising:
a bottom surface;
a substantially horizontal seat elevated above the bottom surface, the seat defining a first recess extending laterally across a portion of the seat;
a backrest angularly reclined from the seat;
a first recess bottom surface positioned below the seat and angled downwardly toward the backrest;
first and second arms extending upward from the seat and laterally outward beyond the backrest, the first arm defining a second recess and the second arm defining a third recess, the second and third recesses extending downward through the first and second arms and angled from the vertical orienting the respective recess openings toward the backrest; and
the body further defining a first through passage through the seat and cradle bottom surface adapted to provide a first audio pathway through the cradle body.

15. The cradle of claim 14 further comprising a charging unit, the charging unit comprises:
a circuit board mounted to a base connected to the cradle body;
a first port in electrical communication with the circuit board adapted to be connected to a power source to provide power to the circuit board;
a second port in electrical communication with the circuit board adapted for transferring power to charge the electronic device.

16. The cradle of claim 14 further comprising:
at least one remote furniture configured speaker selectively digitally connected to at least one of the cradle or electronic device adapted to receive and play audio signals from the electronic device.

17. The cradle of claim 16 wherein the cradle is configured in the form of one of a miniature sitting chair or sofa.

18. The cradle of claim 17 wherein the at least one remote furniture configured speaker comprises a miniature ottoman speaker.

19. The cradle of claim 14 wherein the body further comprises at least one illumination device positioned in the bottom surface and in electronic communication with a power source, the illumination device includes an arcuate lens extending around a portion of the through passage.

\* \* \* \* \*